US009225881B2

(12) United States Patent
Hjelmstrom et al.

(10) Patent No.: US 9,225,881 B2
(45) Date of Patent: Dec. 29, 2015

(54) DIGITAL CAMERA WITH ADJUSTABLE SENSOR

(75) Inventors: Jonas Hjelmstrom, Staffanstorp (SE); Daniel Persson, Landskrona (SE); Jan Sonnvik, Malmo (SE)

(73) Assignee: Axis AB, Lund (SE)

( * ) Notice: Subject to any disclaimer, the term of this patent is extended or adjusted under 35 U.S.C. 154(b) by 532 days.

(21) Appl. No.: 13/367,136

(22) Filed: Feb. 6, 2012

(65) Prior Publication Data

US 2012/0200766 A1 Aug. 9, 2012

Related U.S. Application Data

(60) Provisional application No. 61/441,962, filed on Feb. 11, 2011.

(30) Foreign Application Priority Data

Feb. 8, 2011 (EP) .................................... 11153673

(51) Int. Cl.
*H04N 5/225* (2006.01)

(52) U.S. Cl.
CPC ........... *H04N 5/2252* (2013.01); *H04N 5/2253* (2013.01); *H04N 5/2254* (2013.01); *H04N 5/2258* (2013.01)

(58) Field of Classification Search
CPC . H04N 5/2252; H04N 5/2258; H04N 5/2254; H04N 5/2253
USPC ..................... 348/327, 277.11, 153
See application file for complete search history.

(56) References Cited

U.S. PATENT DOCUMENTS

| 6,642,497 | B1 | 11/2003 | Apostolopoulos |
| 6,678,074 | B1* | 1/2004 | Huang ........................... 358/474 |
| 8,411,194 | B2* | 4/2013 | Davis et al. .................... 348/340 |
| 2004/0223069 | A1* | 11/2004 | Schoonmaker et al. ....... 348/335 |
| 2005/0220469 | A1* | 10/2005 | Fujita et al. ...................... 399/49 |
| 2008/0180522 | A1* | 7/2008 | Kim et al. ........................ 348/50 |
| 2008/0246864 | A1 | 10/2008 | Selin |
| 2009/0104935 | A1 | 4/2009 | Guo |

FOREIGN PATENT DOCUMENTS

| CN | 1420339 A | 5/2003 |
| CN | 1673881 A | 9/2005 |
| CN | 101420473 A | 4/2009 |
| WO | WO 95/06388 A1 | 3/1995 |
| WO | WO 98/26597 A1 | 6/1998 |

OTHER PUBLICATIONS

U.S. Appl. No. 13/846,152, filed Mar. 18, 2013, Hjelmstrom.

(Continued)

*Primary Examiner* — Twyler Haskins
*Assistant Examiner* — Carramah J Quiett
(74) *Attorney, Agent, or Firm* — Oblon, McClelland, Maier & Neustadt, L.L.P.

(57) ABSTRACT

The present invention relates to digital cameras and in particular to positioning of image sensors in digital cameras. By providing a digital camera comprising a lens system, at least one image sensor which is attached to a sensor disc and an axle to which the sensor disc is attached and wherein the axle is configured to allow manipulation thereof for adjusting the tilt of the at least one image sensor, a simple solution is provided, enabling adjustment of the image sensor position in the digital camera.

19 Claims, 5 Drawing Sheets

(56) References Cited

OTHER PUBLICATIONS

Extended European Serach Report issued Jul. 21, 2011 in Application No. 11153673.6, filed Feb. 8, 2011 (English).

Combined Office Action and Search Report issued Aug. 5, 2014 in Chinese Patent Application No. 201210027542.9 (with English translation).

* cited by examiner

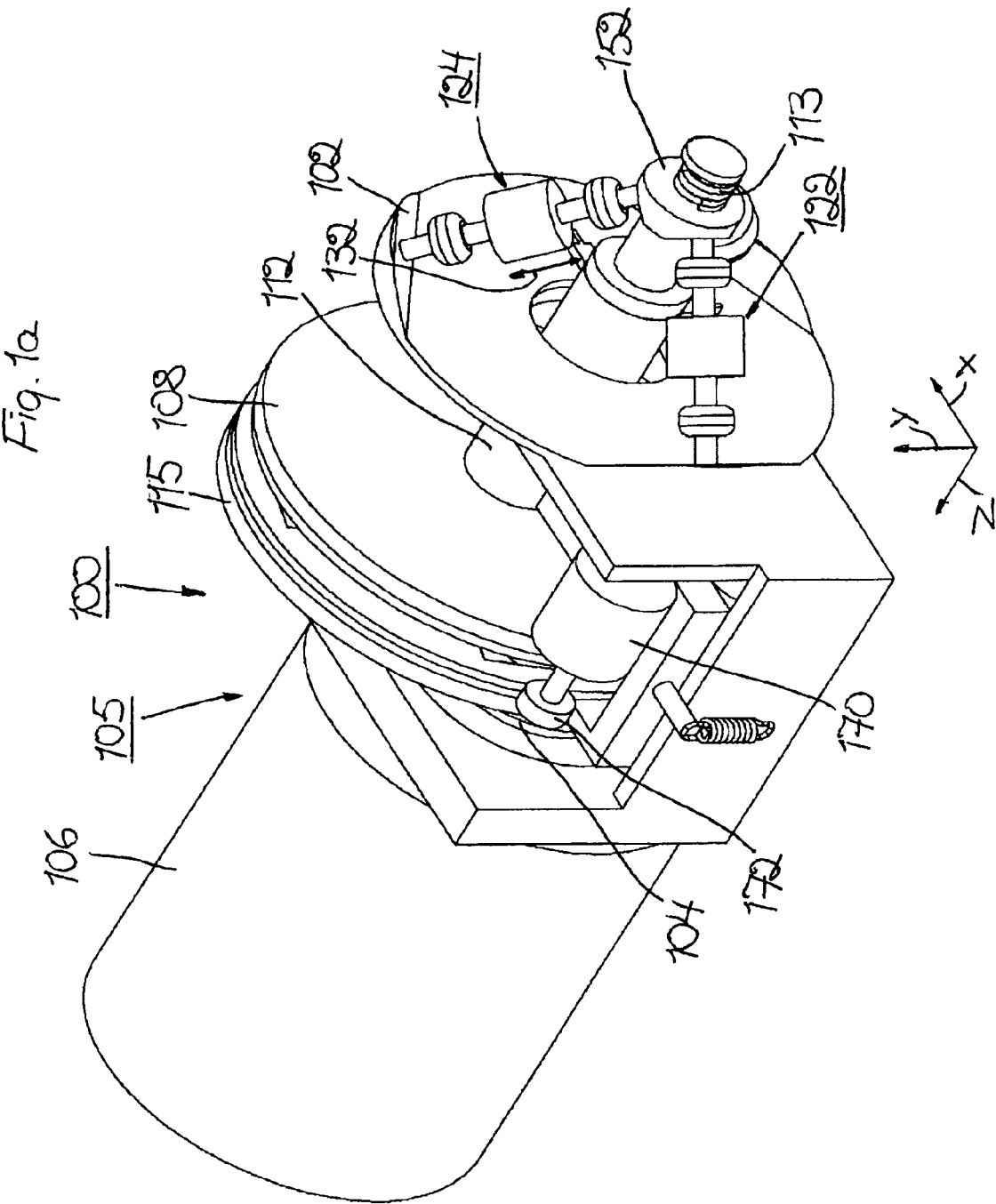

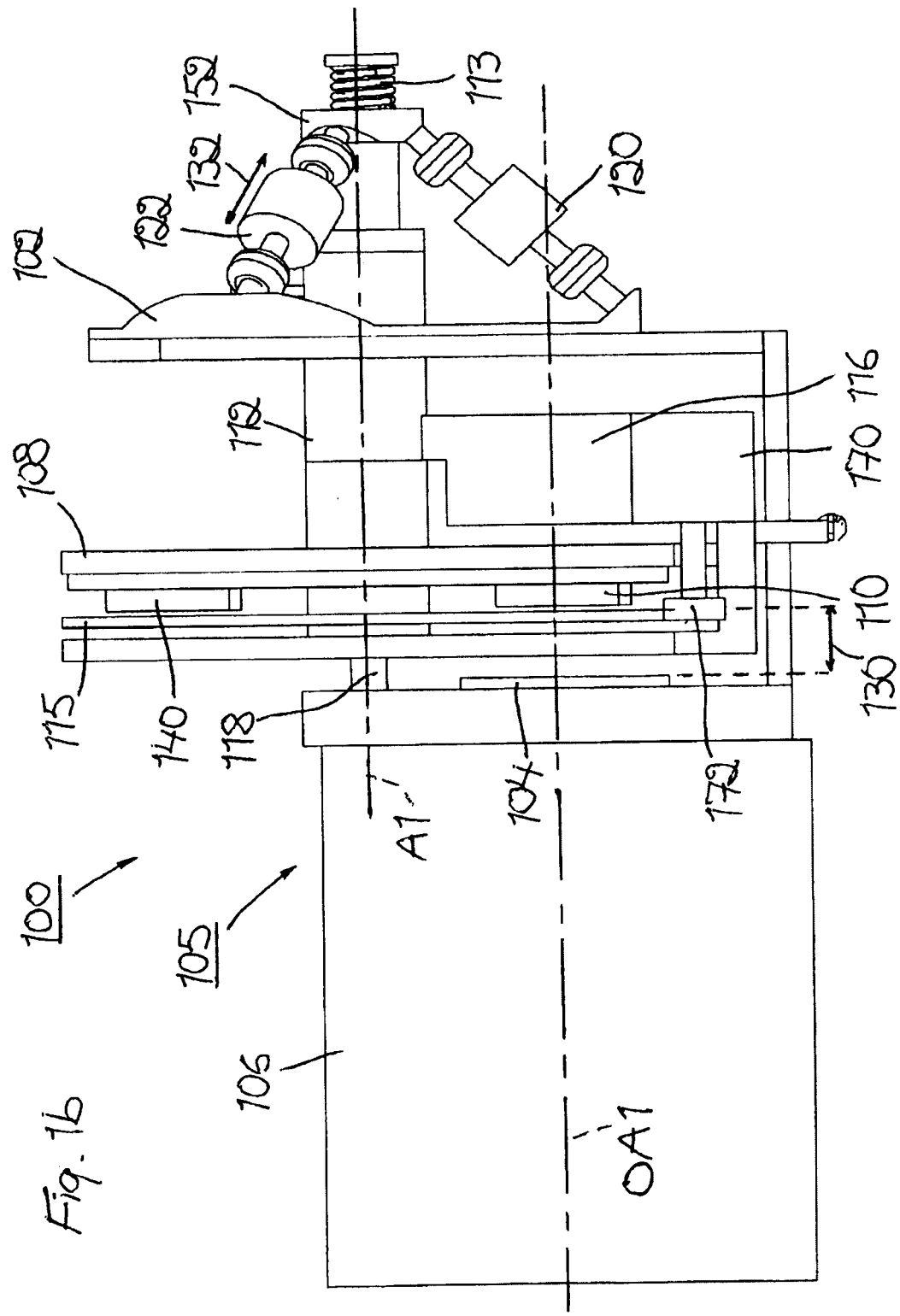

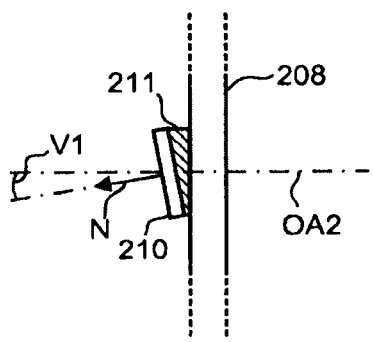
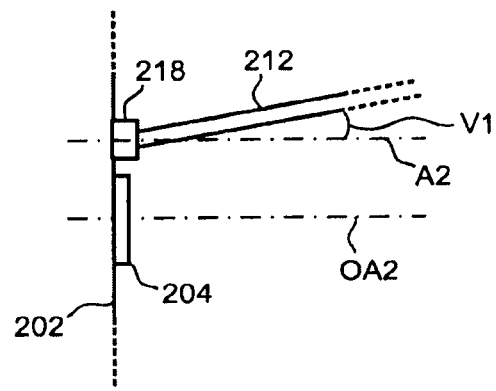
*Fig. 2a*  *Fig. 2b*
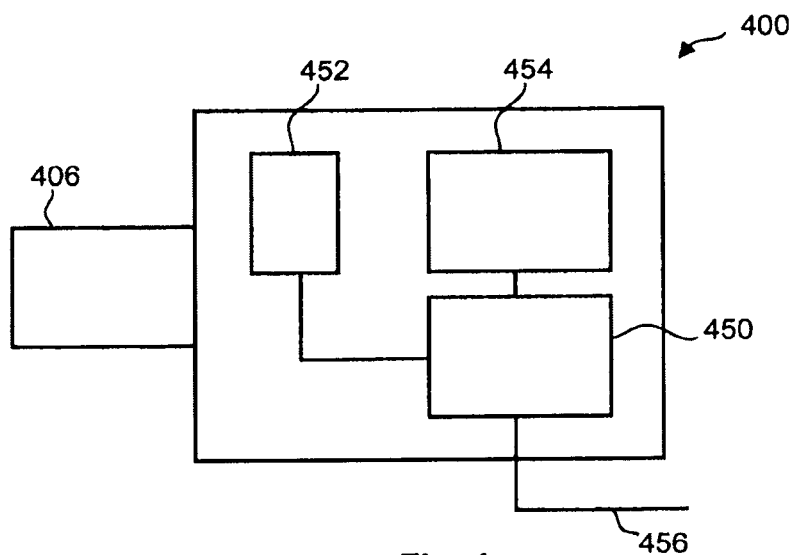
*Fig. 4*

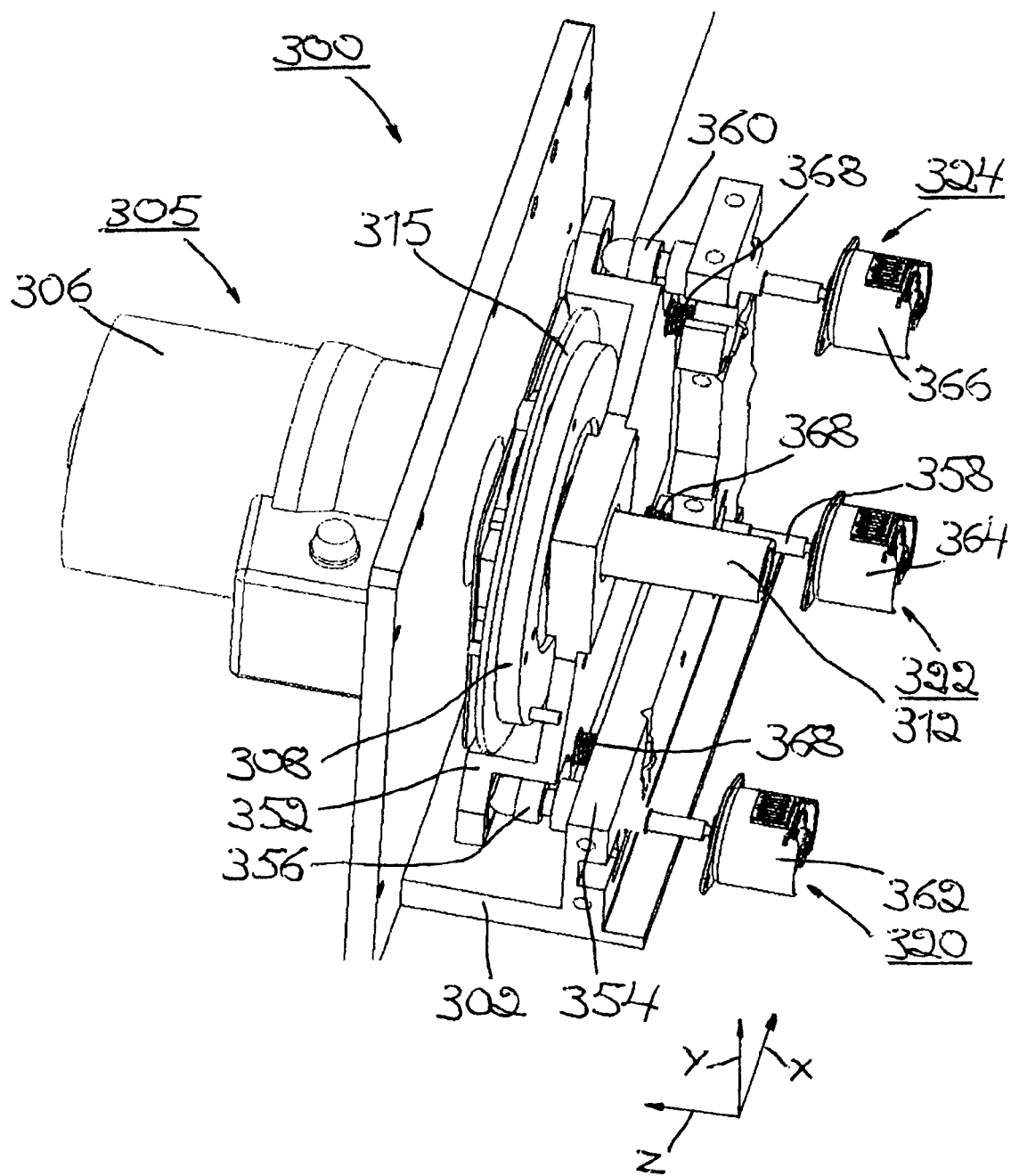

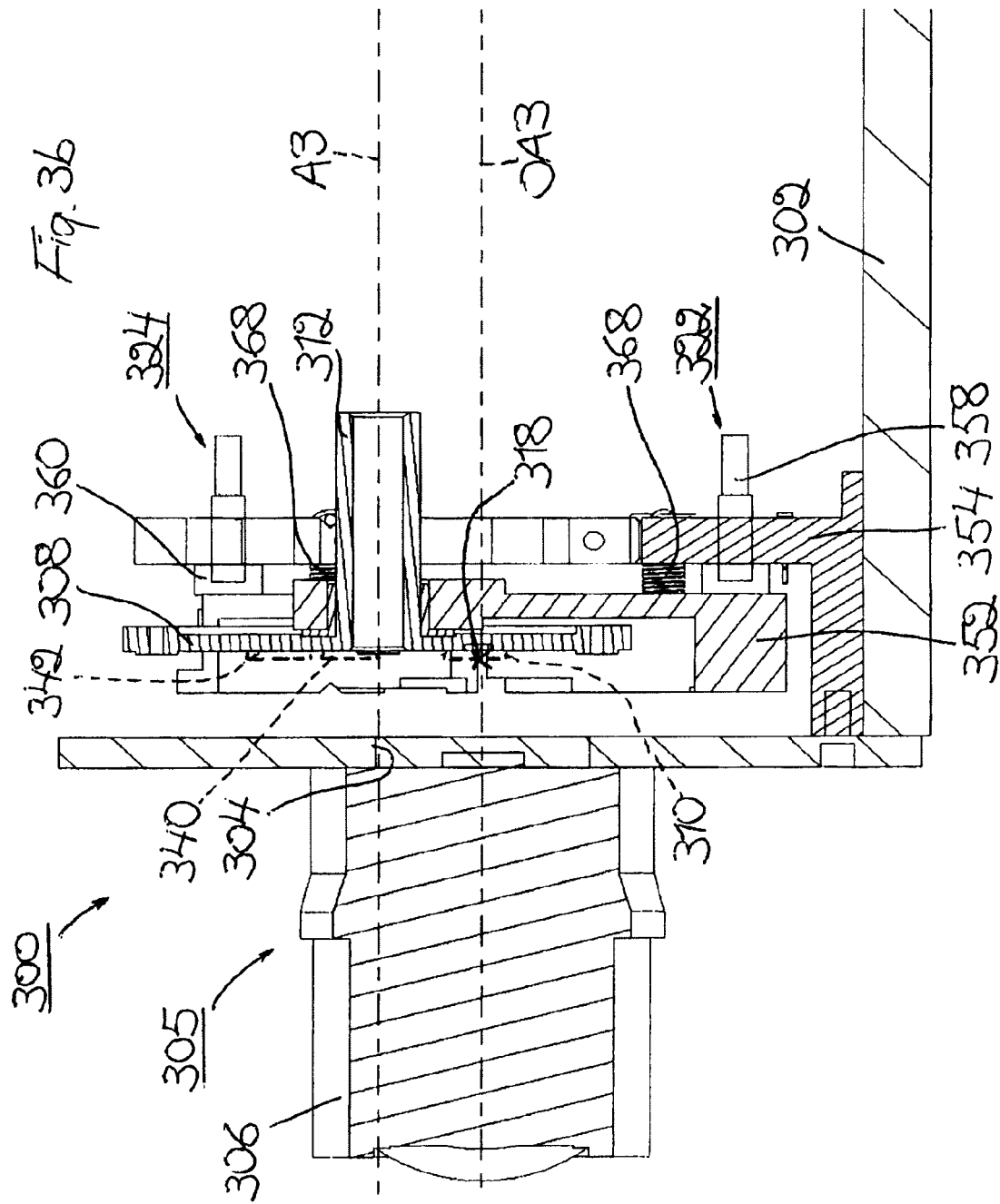

DIGITAL CAMERA WITH ADJUSTABLE SENSOR

This application is based upon and claims the benefit of priority from the prior European Patent Application No. 11153673.6, filed Feb. 8, 2011, the entire contents of which are incorporated herein by reference, and also claims the benefit of provisional U.S. Application Ser. No. 61/441,962 filed Feb. 11, 2011, which is incorporated herein by reference.

TECHNICAL FIELD

The present invention relates to digital cameras and in particular to positioning of image sensors in digital cameras.

BACKGROUND OF THE INVENTION

There are always compromises that have to be made when designing a camera, not least when designing digital cameras for surveillance purposes. Such cameras will typically be required to operate under varying conditions and compromises that have to be made will relate to the choice of combinations of image sensor and optics. More importantly, the acceptable compromises will vary with the scene conditions for a specific camera. As an example, it may be acceptable to sacrifice spatial resolution for light sensitivity during the night, while the same camera should prioritize resolution when the light levels are higher (i.e. daytime). Similar considerations exist for other image parameters, e.g. color reproduction and frame rate (i.e. temporal resolution). The rationale for this in surveillance applications is the fact that it is better to record something in a scene, albeit with lower quality, compared to nothing at all. It also demonstrates the large gamut of conditions faced by a surveillance camera. Furthermore, technologies are often not available to handle the full range of conditions using a specific optics/sensor combination. An example would be a multi-megapixel sensor which could be used as a component in a very high-resolution camera. Ideally, the sensor should also be able to do high quality imaging in low light situations. This implies the use of a sensor with large picture elements (pixels) in order to maximize light sensitivity and dynamic range. Unfortunately, it is typically difficult to equip a camera with a multi-megapixel image sensor having large picture elements and at the same time have the option of using reasonably priced optical components in the standard form factors used for surveillance applications. This constrains component choices to geometrically smaller sensors with corresponding small pixels for a high resolution surveillance camera. So, in this use case it often becomes a matter of sacrificing low light sensitivity and dynamic range for all high-resolution camera use cases, even if it e.g. would be acceptable to use lower resolution in some situations in order to maintain sensitivity.

One way to address the issues above is of course to install several cameras looking at the same scene, but each equipped with different sensors and optics. This will however make the system more complex as well as increase installation- and maintenance costs which are constraining parameters for many surveillance installations.

Another problem, especially in high-resolution surveillance, is the need for very accurate positioning of the sensor with regard to the lens focal plane. This becomes a severe camera design constraint when pixel size goes down. Camera unit-to-unit differences with regard to mechanical tolerances in combination with impact of varying ambient temperatures compounds the problem. The resulting issues must be addressed in the design phase as well as during production, all of which of course increases product complexity and unit cost.

SUMMARY OF THE INVENTION

It is an object of the present invention to obviate at least some of the above-mentioned drawbacks. In terms of compromises when designing digital cameras for surveillance purpose a user would greatly benefit from a single camera with the ability to transform itself between the acceptable use cases.

To address the issue with the need for a very accurate positioning of the sensor with regards to the lens focal plane, a cost-effective technology for making the adjustment dynamically in the field and potentially automatically, would be a great benefit.

The above object is achieved by providing an improved digital camera according to the present invention. The camera comprises a lens system. At least one image sensor is attached to a sensor disc. The sensor disc is attached to an axle. The axle is configured to allow manipulation thereof for adjusting the position of the at least one image sensor. The axle is configured to allow manipulation thereof for tilting the sensor disc such that a normal direction of the image sensor positioned in the optical path is adjusted angularly in relation to the optical axis of the lens system.

In other words, a simple solution is provided that enables adjustment of an image sensor position in a digital camera. The meaning of "position" is to be interpreted widely and include coordinates in a coordinate system as well as tilting, swivelling and rotation in a coordinate system.

In a further embodiment of the digital camera according to the present invention, two or more image sensors are attached to the sensor disc, and the sensor disc is configured for rotation around a first axis for positioning one of the image sensors in the optical path.

Accordingly, where two or more image sensors are attached to the sensor disc, one image sensor may have small picture elements and the other image sensor may have large picture elements. Thereby, the disadvantage of having to compromise when designing the digital camera, as discussed above, is obviated. Furthermore, by providing image sensors attached to a sensor disc, it is possible to obtain a very compact configuration where the image sensors may be positioned, in the optical path, very close to the lens system. This is desirable when using e.g. C or CS type lens mounting means having focal distances of about 1-2 cm.

The axle may also be configured to allow manipulation thereof for displacing the sensor disc in a direction along the optical axis of the lens system, thereby changing a back focal distance.

Embodiments include those where the axle is suspended by means of an adjustment carrier and is manipulated by a plurality of actuators engaging the adjustment carrier, and where the actuators are, through the adjustment carrier, configured for manipulating the axle to adjust the position of the sensor disc in proportion to actuator displacement.

In other words, actuators may be arranged in such a manner that, when they are actuated, e.g. by means of control circuitry inside or outside of the camera, any image sensor can be repositioned with regard to focal distance and/or tilting. This is advantageous, since it is possible to compensate for any spatial misalignment associated with the image sensor. During manufacture, an image sensor is e.g. typically glued or otherwise fixed to some kind of carrier and attached to a small printed circuit board, which in turn is attached to a sensor disc as mentioned above. Although the tolerances involved during manufacture are typically small, there will always be variations among the image sensors in terms of alignment of the normal direction with the optical axis as well as distances along the optical axis.

The actuators, there may e.g. be three actuators, may be linear displacement actuators connected at one end to a housing of the camera and engaging the adjustment carrier at an opposite end.

The axle may be configured to allow pivoting thereof around a pivot point located on the optical axis of the lens system, e.g. in the same plane as the light sensitive plane of the image sensor, or the pivot point may be located in front of or behind the image sensor.

Embodiments include those where the axle is configured to allow pivoting around a pivot point located in a pivot point mount attached to the housing.

Such embodiments have advantages since they provide simple and effective solutions, using a minimum of components.

Each actuator may comprise a positioning means attached to an actuator bracket connected to the housing and engaging the adjustment carrier with a free end. Such embodiments may include a positioning sensor configured to register the position of each positioning means. Furthermore, spring means may be provided, attached at one end to the actuator bracket and at an opposite end to the adjustment carrier.

By including positioning sensors it is possible to do an initial calibration of the sensors and to use the read out from the sensors (plus the actuator step indication if possible) to be able to return to the calibrated step after a new sensor has been put in place in the optical path. If also a temperature sensor is included in the camera, a combined temperature/positioning sensor calibration will be possible as the temperature also may give a certain misalignment angle of the sensor causing it to tilt in an unwanted direction.

A component wheel may be arranged between the lens system and the sensor disc, the component wheel being configured to hold at least one active or passive component. Finally, the digital camera according to the present invention may further comprise a calibration means for calibrating at least one image sensor not positioned in the optical path behind the lens system.

Thereby, it is ensured that each image sensor is correctly calibrated before it is rotated into an operating position in the optical path behind the lens system.

BRIEF DESCRIPTION OF THE DRAWINGS

The present invention will be further described below by way of example only and with reference to the accompanying drawings, in which FIG. 1a is a schematic perspective view of one embodiment of a digital camera according to the present invention.

FIG. 1b is a schematic side view of the digital camera according to FIG. 1a.

FIG. 2a is a schematic sectional view of an image sensor attached to a sensor disc.

FIG. 2b is a schematic sectional view of an axle.

FIG. 3a is a schematic perspective view of another embodiment of a digital camera according to the present invention.

FIG. 3b is a schematic side view of the digital camera according to FIG. 3a.

FIG. 4 is a schematic block diagram of a digital camera.

DETAILED DESCRIPTION OF PREFERRED EMBODIMENTS

FIGS. 1a and 1b are schematic illustrations of parts of a digital camera 100 positioned in relation to an orthogonal coordinate system x, y, z. The camera 100 comprises a housing, of which housing only a part is indicated by reference numeral 102, on which a lens system 105, consisting of one or more lenses 106 and means 104 for mounting said one or more lenses, is attached. The lens mounting means 104 may be of any suitable type capable of mounting the lens system 105, e.g. a flange for C-type and CS-type mount lenses. According to the invention, at least one image sensor is attached to a sensor disc 108. In the embodiment illustrated in FIGS. 1a and 1b, two image sensors 110, 140 are attached to the sensor disc 108. The sensor disc 108 is in turn attached to an axle 112. The axle 112 is mounted such that it may rotate around an axis A1 parallel with the z-direction of the system. This means that the sensor disc 108 attached to the axle 112 also rotates around the axis A1. By means of this rotation of the sensor disc 108, each image sensor 110, 140 on the sensor disc 108 may be positioned in the optical path behind the lens system 105, i.e. on the optical axis OA1 of the lens system 105. Rotation of the axle 112 around the axis A1 may be achieved by means of electric circuitry, comprising e.g. control circuitry as well as an electric motor with a rotation interface mechanism 116 or other type of transmission. When the sensor disc 108 is rotated around the axis A1, the position of each image sensor in the xy-plane is changed.

FIG. 2a illustrates a detail of a sensor disc 208 and a sensor 210 that may correspond to the sensor disc 108 and any of the sensors 110, 140 in FIG. 1. As illustrated in FIG. 2a, when attaching the image sensor 210 to the sensor disc 208, the attachment may be performed such that the image sensor 210 is misaligned, e.g. being non-parallel with the sensor disc 208. Misalignment may be due to e.g. uneven spreading of glue 211 when the image sensor 210 is attached to the sensor disc 208. Other reasons for this misalignment may be uneven soldering of the sensor package to the PCB, that the sensor chip is mounted with a tilting angle inside the sensor package and/or added mechanical tolerances in the various mechanical parts. The misalignment is such that the image sensor 210, having a normal direction N, is tilted an angle V1 in relation to the optical axis OA2.

According to the invention, the axle 112 is configured to allow manipulation thereof for adjusting the position of an image sensor. Consequently, to compensate for possible misalignment in the form of tilt in 2 orthogonal axis of any one of the image sensors 110, 140 in the embodiment of FIG. 1a and 1b, the axle 112 is configured to allow manipulation thereof such that the normal direction N of the image sensor positioned in the optical path behind the lens system 105 is adjusted angularly in relation to the optical axis OA1 of the lens system. FIG. 2b illustrates this schematically where an axle 212 attached to a housing 202 via a pivot point mount 218 located near a lens mounting means 204. The axle 212 has been adjusted to an angle V1 with respect to an axis A2 parallel with the optical axis OA2.

Continuing with reference to FIGS. 1a and 1b, the axle 112 is configured to allow manipulation thereof for being adjusted an angle in relation to the optical axis OA1 as well as displacing the sensor disc 108 in a direction along the optical axis OA1 of the lens system 105, thereby changing a back focal distance 130. To accomplish this adjustment and displacement respectively, the axle 112 is suspended by means of an adjustment carrier 152 and manipulated by a plurality of actuators 120, 122, 124 which engage the adjustment carrier. The actuators 120, 122, 124 are, through the adjustment carrier 152, configured for manipulating the axle 112 to adjust the position of the sensor disc 108 in proportion of the actuator displacement. In the illustrated embodiment of FIG. 1a and 1b, the actuators 120, 122, 124 are linear displacement actuators which at one end are connected to the housing 102 and which at an opposite end are engaging the adjustment carrier 152 via resilient spring means 113. Reference numeral 132 indicates an example of the direction of displacement.

In the embodiment of FIGS. 1a and 1b, the axle 112 is suspended in a pivot point mount 118 and configured to allow pivoting of the axle 112 around a pivot point located in the pivot point mount 118 on the housing 102. Thus, any adjustment of the axle 112 by means of the actuators 120, 122, 124 generates a pivoting movement of the axle around the pivot point in the pivot point mount 118. The adjustment carrier 152 may be of any suitable type for the intended purpose. The adjustment carrier 152 may e.g. be a bearing allowing movement of the axle 112 therein.

FIGS. 3a and 3b are schematic illustrations of parts of an alternative digital camera 300 positioned in relation to an orthogonal coordinate system x, y, z. As in the embodiment of FIGS. 1a and 1b, the camera 300 comprises a housing 302 (only parts of which is indicated by reference numeral 302) on which a lens system 305, consisting of one or more lenses 306 and means 304 for mounting said one or more lenses, is attached. The lens mounting means 304 may be of any suitable type capable of mounting a lens system 305, e.g. a flange for C-type and CS-type mount lenses. Three image sensors 310, 340, 342 are attached to a sensor disc 308. The sensor disc 308 is in turn attached to an axle 312. The axle 312 is mounted such that it may rotate around an axis A3. This means that the sensor disc 308 attached to the axle 312 also rotates around the axis A3. By means of this rotation of the sensor disc 308, the image sensors 310, 340, 342 on the sensor disc may be positioned in the optical path behind the lens system 306, i.e. on the optical axis OA3 of the lens system. Rotation of the axle 312 around the axis A3 may be achieved by means of electric circuitry, comprising e.g. control circuitry as well as an electric motor and a rotation interface mechanism or other type of transmission. When the sensor disc 308 is rotated around the axis A3, the position of each image sensor 310, 340, 342 in the xy-plane is changed.

To compensate for possible misalignment of any one of the image sensors 310, 340, 342 in the embodiment of FIGS. 3a and 3b, the axle 312 is also in this embodiment configured to allow manipulation thereof such that the normal direction of the image sensor, positioned in the optical path behind the lens system 305, is adjusted angularly in relation to the optical axis OA3 of the lens system. According to the invention, the axle 312 is also configured to allow manipulation thereof for displacing the sensor disc 308 in a direction along the optical axis OA3 of the lens system 305, thereby changing a back focal distance. To accomplish this adjustment and displacement respectively, the axle 312 is suspended by means of an adjustment carrier 352 and manipulated by a plurality of actuators 320, 322, 324 which engage the adjustment carrier. The actuators 320, 322, 324 are, through the adjustment carrier 352, configured for manipulating the axle 312 to adjust the position of the sensor disc 308 in proportion of the actuator displacement. In the illustrated embodiment of FIGS. 3a and 3b, the actuators 320, 322, 324 are linear displacement actuators which at one end are connected to the housing 302 and which at an opposite end are engaging the adjustment carrier 352. The actuators 320, 322, 324 are connected to the housing 302 via an actuator bracket 354. The axle 312, which is rotatably journalled in the adjustment carrier 352, is, contrary to the embodiment of FIGS. 1a and 1b, configured to allow pivoting thereof around a pivot point 318 which is located on the optical axis OA3 of the lens system 306. The pivot point 318 is in the embodiment of FIGS. 3a and 3b located on the optical axis OA3 in the plane of the light sensitive surface of the image sensor 310, 340, 342 which is positioned in the optical path behind the lens system 306. However, the pivot point 318 may alternatively be located on the optical axis OA3 in front of the image sensor or behind the image sensor which is positioned in the optical path behind the lens system 306.

In the embodiment of FIGS. 3a and 3b, each actuator 320, 322, 324 comprises a positioning means 356, 358, 360 and a motor 362, 364, 366 (the motors are shown only in FIG. 3a). Each positioning means 356, 358, 360 is attached to the actuator bracket 354 and thus, to the housing 302 and engage the adjustment carrier 352 with a free end. In the embodiment of FIGS. 3a and 3b the positioning means comprises three screws 356, 358, 360. The screws are operated by the motors 362, 364, 366, e.g. piezo-motors, stepping motors or piezo-elements. A positioning sensor may be provided, said positioning sensor being configured to register the position of each positioning means 356, 358, 360. The purpose of the positioning sensor is inter alia, as previously stated, to do an initial calibration of the image sensors 310, 340, 342. Further, spring means 368 are provided, attached at one end to the actuator bracket 354 and at an opposite end to the adjustment carrier 352 in order to carry said adjustment carrier. Finally the axle 312 is rotatably journalled within the adjustment carrier and the sensor disc 308 is attached to said axle.

According to the invention, the above-mentioned digital cameras 100; 300 may further comprise a component wheel 115; 315 which in the illustrated embodiments according to FIGS. 1a, 1b and 3a (the wheel is omitted in FIG. 3b for reasons of clarity) is arranged between the lens system 106; 306 and the sensor disc 108; 308. The component wheel 115; 315 is configured to hold at least one active or passive component. These components may include measurement and/or calibration means for calibrating at least one of the image sensors 110, 140; 310; 340, 342 not positioned in the optical path behind the lens system 106; 306. Alternatively, two or more active or passive components may be attached to the component wheel 115; 315 and the component wheel may be configured for rotation around the first axis A1; A3 for positioning one of the active or passive components between the lens system 106; 306 and the image sensor positioned within the optical path of the system. Another component attached to the component wheel may be positioned in front of a non active image sensor. The component wheel 115; 315 is then rotatable independently of the sensor disc 108; 308 and may be connected to the same axle as the sensor disc or to a separate axle. The component wheel 115; 315 may be rotatable e.g. in the same manner as the sensor disc, i.e. by means of electric circuitry comprising e.g. control circuitry as well as an electric motor, and a rotation interface mechanism or other type of transmission. The component wheel 115; 315 may also be subject to a tilt adjustment in the same manner as described for the sensor disc or in an alternative manner. Examples of passive components for mounting on the component wheel 115; 315 are different types of IR-filters, e.g. IR-pass filters, IR-block filters, NIR-filters, diffraction filters and/or polarization filters. Examples of active components for mounting on the component wheel 115; 315 are image amplifiers, different types of light sources that typically may be used during calibration of an image sensor and/or LCD-displays as a means to limit incoming light.

By including positioning sensors, for example included in the circuitry of which the motors 362, 364, 366 form part, it is possible to do an initial calibration of the sensors 310, 340, 342 and to use the read out from the sensors (plus the actuator step indication if possible) to be able to return to the calibrated step after a new sensor has been put in place in the optical path. If also a temperature sensor is included in the camera, a combined temperature/positioning sensor calibration will be possible as the temperature also may give a certain misalignment angle of the sensor causing it to tilt in an unwanted direction.

The above presented embodiments of the digital camera comprise several image sensors attached to a sensor disc which in turn is attached to a rotatable axle. However the axle may also be non-rotatably mounted and consequently, the sensor disc may instead be rotatably attached to the axle and rotatably operated in any suitable manner for correct positioning of the image sensors. The axle may also in this embodiment be configured to allow manipulation thereof for adjusting the position of an image sensor.

According to an alternative embodiment, not illustrated in the drawings, the axle and sensor disc may be configured not to rotate but still allow misalignment adjustment of the sensor disc, and the attached image sensor, in terms of tilt angle and/or back focal distance in the z-direction. As in previous embodiments the axle is configured to allow manipulation thereof for adjusting the position of an image sensor. In such an embodiment, the adjustment may be carried out by means of actuators or alternatively the drive electronic circuitry may be omitted whereby a simple mechanical adjustment of the axle provides a desired position adjustment of the sensor disc and thus, of the image sensor. Accordingly, in such an embodiment, there is normally only one image sensor.

FIG. 4 is a block diagram of a digital camera 400 with a lens system 406. This digital camera 400 is similar to the digital cameras described above, but instead of showing mechanical functional units in detail, the camera shows electronic functional blocks. Thus, the digital camera 400 comprises a processing unit 450 that is configured to control the operation of the camera. The processing unit 450 is connected to an image sensor 452 and electric circuitry 454 which comprises driving means, e.g. a motor, configured to rotate and tilt an axle to which the image sensor is attached. The processing unit 450 is also connected to external systems, via a connection 456, with which the digital camera communicates data such as images obtained by means of the image sensor 452.

The invention claimed is:

1. A digital camera, comprising:
a lens system having an optical axis; and
a sensor disc having a surface that faces toward the lens system;
at least one image sensor attached to the surface of the sensor disc in an optical path of the lens system;
an axle attached to the sensor disc and extending from the sensor disc;
an adjustment carrier including a portion to which the axle connects so that the axle is suspended by the adjustment carrier, the axle being pivotal around a pivot point to vary an angular displacement between a longitudinal axis of the axle and the optical axis; and
a plurality of actuators, each actuator including
a fixed portion connected directly or indirectly to a housing of the digital camera and
a free end that is movable relative to the fixed portion and engages the adjustment carrier to move the adjustment carrier, thereby manipulating the axle to tilt the sensor disc such that a normal direction of the image sensor positioned in the optical path of the lens system is angularly adjustable in relation to the optical axis of the lens system.

2. The digital camera according to claim 1, wherein two or more image sensors are attached to the sensor disc, and the sensor disc is rotatable around a first axis for positioning one of the image sensors in the optical path.

3. The digital camera according to claim 2, wherein the axle is to displace the sensor disc in a direction along the optical axis of the lens system to change a back focal distance.

4. The digital camera according to claim 1, wherein the axle is to displace the sensor disc in a direction along the optical axis of the lens system to change a back focal distance.

5. The digital camera according to claim 2, said camera further comprising:
processing circuitry configured to calibrate at least one image sensor not positioned in the optical path behind the lens system.

6. The digital camera according to claim 1, wherein the actuators are linear displacement actuators connected at one end to the housing and engaging the adjustment carrier at an opposite end.

7. The digital camera according to claim 6, wherein each actuator comprises a positioning member attached to an actuator bracket connected to the housing.

8. The digital camera according to claim 7, said camera further comprising
a positioning sensor configured to register a position of each positioning member.

9. The digital camera according to claim 7, said camera further comprising:
a spring attached at one end to the actuator bracket and at an opposite end to the adjustment carrier.

10. The digital camera according to claim 1, wherein the pivot point is located on the optical axis of the lens system.

11. The digital camera according to claim 10, wherein the pivot point is located on the optical axis in front of the image sensor.

12. The digital camera according to claim 10, wherein the pivot point is located on the optical axis behind the image sensor.

13. The digital camera according to claim 1, wherein the pivot point is located in a pivot point mount attached to the housing.

14. The digital camera according to claim 1, wherein each actuator comprises a positioning member attached to an actuator bracket connected to the housing.

15. The digital camera according to claim 14, said camera further comprising
a positioning sensor configured to register a position of each positioning member.

16. The digital camera according to claim 14, said camera further comprising:
a spring attached at one end to the actuator bracket and at an opposite end to the adjustment carrier.

17. The digital camera according to claim 15, said camera further comprising:
a spring attached at one end to the actuator bracket and at an opposite end to the adjustment carrier.

18. The digital camera according to claim 1, said camera further comprising:
a component wheel arranged between the lens system and the sensor disc, the component wheel being configured to hold at least one active or passive component.

19. The digital camera according to claim 1, wherein the axle is to adjust the position of the at least one image sensor by tilting the sensor disc about two orthogonal axes such that the normal direction of the image sensor positioned in the optical path of the lens system is angularly adjustable in relation to the optical axis of the lens system.

* * * * *